US008620035B2

(12) United States Patent
D'Hose

(10) Patent No.: US 8,620,035 B2
(45) Date of Patent: Dec. 31, 2013

(54) METHOD FOR CORRECTING THE POSITION OF THE EYES IN AN IMAGE

(75) Inventor: Johan D'Hose, Palaiseau (FR)

(73) Assignee: Thales, Neuilly sur Seine (FR)

( * ) Notice: Subject to any disclaimer, the term of this patent is extended or adjusted under 35 U.S.C. 154(b) by 176 days.

(21) Appl. No.: 12/962,086

(22) Filed: Dec. 7, 2010

(65) Prior Publication Data

US 2011/0299742 A1    Dec. 8, 2011

(30) Foreign Application Priority Data

Dec. 8, 2009    (FR) .................................... 09 05937

(51) Int. Cl.
*G06K 9/00*    (2006.01)
*G06K 9/68*    (2006.01)
*G06K 9/32*    (2006.01)

(52) U.S. Cl.
USPC ............ 382/117; 382/103; 382/218; 382/293

(58) Field of Classification Search
None
See application file for complete search history.

(56) References Cited

U.S. PATENT DOCUMENTS

| 7,130,453 B2 * | 10/2006 | Kondo et al. | 382/117 |
| 2003/0152252 A1 * | 8/2003 | Kondo et al. | 382/117 |
| 2006/0098867 A1 | 5/2006 | Gallagher | |

FOREIGN PATENT DOCUMENTS

EP    2 081 152    7/2009

OTHER PUBLICATIONS

D'Hose et al., "Precise Localization of Landmarks on 3D Faces using Gabor Wavelets", Sep. 29, 2007, 1st IEEE International Conference on Biometrics: Theory, Applications, and Systems, 2007, p. 1-6.*
Besl et al., "A Method for Registration of 3-D Shapes", Feb. 2, 1992, IEEE Transactions on Pattern Analysis and Machine Intelligence, vol. 14, No. 2, p. 239-256.*

* cited by examiner

*Primary Examiner* — Stephen R Koziol
*Assistant Examiner* — Timothy Choi
(74) *Attorney, Agent, or Firm* — Baker & Hostetler LLP

(57) ABSTRACT

A method for determining the position of the eyes includes: a step for determining approximate positions of the eyes in the digital image; a step for determining adjacent positions; a step of geometric transformation of the digital image into normalized images in such a way as to make the adjacent positions coincide with the reference positions; a step of comparison of at least a part of each normalized image with a corresponding part of a predetermined image, each comparison providing a score representing the level of resemblance between the parts of images; and a step of declaration of the adjacent positions associated with the best score as actual positions of the eyes of the face.

9 Claims, 2 Drawing Sheets

METHOD FOR CORRECTING THE POSITION OF THE EYES IN AN IMAGE

CROSS-REFERENCE TO RELATED APPLICATION

This application claims priority to foreign French patent application No. FR 09 05937, filed on Dec. 8, 2010, the disclosure of which is incorporated by reference in its entirety.

FIELD OF THE INVENTION

The invention relates to image processing, in particular biometrics. More particularly, the invention relates to a method for determining the position of the eyes of a face in a digital image, and another method for progressively correcting the position of the eyes through iterations of steps of the method.

BACKGROUND OF THE INVENTION

From image processing operations which entail identifying or authenticating a person, those based on the recognition of all or part of their face, such as facial recognition or iris recognition processing operations, are singled out. Identification and authentication are understood respectively as the determination and verification of the identity of the person. These processing operations normally comprise a step of acquisition of an image of the person, a step of localisation of his face and his eyes in the acquired image, a step of extraction of a model representing his biometric data on the basis of the positions of his eyes, and a step of comparison of the model with one or more other models representing given persons. For most of these image processing operations, the results of the step of extraction of the model representing biometric data of the person, notably in terms of error rates, depend largely on the precision of the determination of the positions of the eyes in the image. The algorithms for determining the position of an eye in an image generally provide approximate positions, notably if the image is acquired "on-the-fly", i.e. without the cooperation of the person detected.

SUMMARY OF THE INVENTION

The invention overcomes the aforementioned disadvantages by providing positions of the eyes of a face in an image with a greater precision. For this purpose, the invention is based on the comparison of a part of a reference face with different parts of the face for which the position of the eyes is sought, these different parts being defined relative to different possible positions of the eyes. More precisely, the subject-matter of the invention is a method for determining the position of the eyes of a face in a digital image comprising the following successive steps:
- a step of determining a pair of approximate positions of the eyes in the digital image,
- a step of determining test pairs of positions of the eyes on the basis of the pair of approximate positions, each position of an eye in a test pair being in the adjacent area of the approximate position of the corresponding eye,
- a step of geometric transformation, for each test pair, of the digital image into a normalised image in such a way as to make the positions of the eyes of each test pair coincide with a pair of predetermined reference positions,
- a step of comparison of at least a part of each normalised image covering at least a part of the face with a corresponding part of a predetermined image, each comparison providing a score representing the level of resemblance between the part of the normalised image and that of the predetermined image,
- a step of declaration of the positions of the eyes of the test pair associated with the best score as actual positions of the eyes of the face.

The invention includes a method for progressively correcting the position of the eyes of a face in a digital image on the basis of a pair of approximate positions and an adjacent area around each approximate position. This method comprises an iteration of all of the preceding steps except that of determining a pair of approximate positions of the eyes in a digital image, the approximate positions taken into account in each iteration being given by the last step of the preceding iteration. In this method, the dimension of the adjacent area is reduced in each iteration.

According to an embodiment, the adjacent area of the approximate position of an eye is determined by a circle with radius "r" centered on the position.

The radius r may be an average of Euclidean distances between the real position of an eye in an image of a learning base and the approximate position of this eye determined by the image processing algorithm used for the step of determining a pair of approximate positions.

Test pairs may be determined in such a way that the position of at least one eye in each of these test pairs is located on the circle with radius r centered on the approximate position of the corresponding eye.

Test pairs may also be determined on the basis of a combination of positions, where each position corresponds either to the approximate position of the eye concerned or to one of the four cardinal positions located on the circle with radius r centered on said approximate position or to one of the four intercardinal positions located on the circle with radius r centered on said approximate position.

The invention can be implemented in an existing image processing chain for facial or iris recognition without requiring substantial modifications, the processing algorithms used for the method according to the invention already being currently used in an image processing chain of this type.

BRIEF DESCRIPTION OF THE DRAWINGS

The invention will be more easily understood and other advantages will become clear from a reading of the detailed description of embodiments thereof, presented by way of example, and set out with reference to the attached drawings, in which.

DETAILED DESCRIPTION

Figure 1:
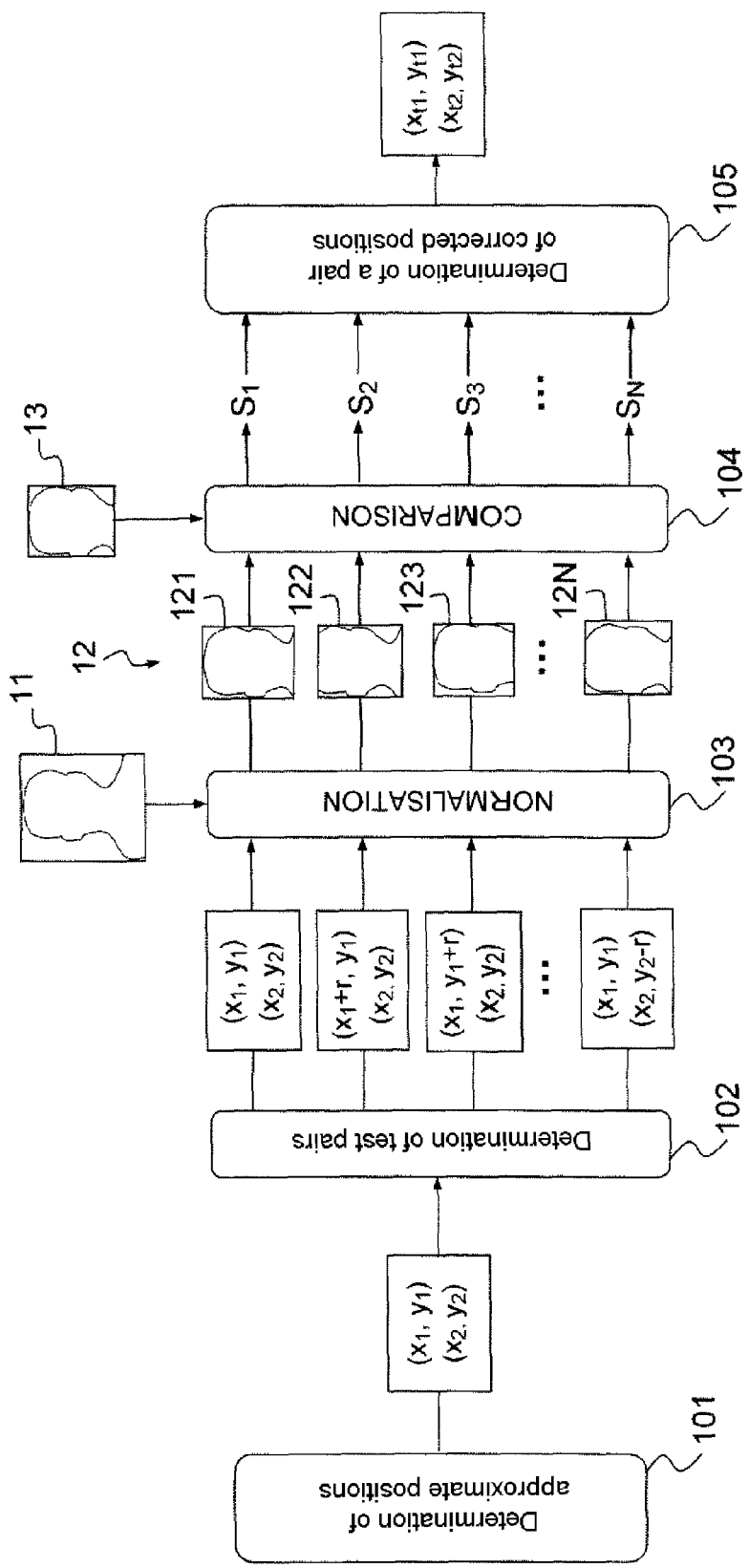
FIG. 1 shows an example of the method for determining the position of the eyes in an image according to the invention.

FIG. 1 shows schematically the method for determining the position of the eyes of a face in a digital image according to the invention. For the remainder of the description, a digital image 11 will be considered on which a human or animal face is shown. A system of coordinates is associated with the digital image in order to reference particular points of this image 11, notably the position of the eyes of the face. The system of coordinates is, for example, a system of Cartesian coordinates in which the pair of coordinates (x, y) denotes a point on the x axis x and on the y axis y. The system of coordinates may also be based on the subscripting of rows and columns of pixels in the digital image 11.

In a first step 101, the approximate position of the eyes in a digital image 11 is determined. The approximate position of a first eye is referenced by the pair $(x_1, y_1)$ and the approximate position of a second eye is referenced by the pair $(x_2, y_2)$. Any image processing algorithm providing the position of the eyes in a digital image can be used. These algorithms being generally imprecise, the method for determining the position of the eyes according to the invention comprises additional steps.

In a second step 102, a plurality of possible positions for each eye is determined in the adjacent area of the approximate position of the eye concerned. The different possible positions are referred to as test positions and are referenced in a generic manner by the pair of coordinates $(x_t, y_t)$. For the same face, it is therefore possible to combine one of the test positions of the first eye $(x_{t1}, y_{t2})$ with one of the test positions of the second eye $(x_{t2}, y_{t2})$ in such a way as to construct different pairs of test positions. These pairs are referred to as test pairs. According to a particular embodiment, the adjacent area of an approximate position (x, y) can be determined by a circle with radius r centered on this position. The value of this radius r will be described in detail below. A test position $(x_t, y_t)$ may therefore be located anywhere in this circle. For the remainder of the description, nine test positions for each eye will be considered by way of example, i.e. the original position (x, y), the four cardinal positions located on the circle, i.e. N (x, y+r), S (x, y−r), E (x+r, y), W (x−r, y), and the four intercardinal positions located on the circle, i.e. NE (x+r/√2, y+r/√2), NW (x−r/√2, y+r/√2), SE (x+r/√2, y−r/√2), SW (x−r/√2, y−r/√2). In this example, 81 test pairs are thus enumerated. More generally, N test pairs are considered.

In a third step 103, the original digital image 11 is normalized relative to each test pair in such a way as to form as many images, referred to as normalized images 12, as test pairs. The normalized images 12 are referenced individually 12n, where n varies from 1 to N. The original image normalization 11 relative to a test pair essentially consists in carrying out a geometric transformation of each image into an image in which the test positions of the test pair concerned, denoted $(x'_{t1}, y'_{t1})$ and $(x'_{t2}, y'_{t2})$ in the normalized images 12, coincide with predetermined reference points, denoted $(x_{ref1}, y_{ref1})$ and $(x_{ref2}, y_{ref2})$. These reference points in fact correspond to the positions to which the eyes of the face are to be "brought" for recognition processing purposes. Following normalization, all the test positions of the same eye $(x'_{t1}, y'_{t1})$ or $(x'_{t2}, y'_{t2})$ therefore have the same coordinates $(x_{ref1}, y_{ref1})$ or $(x_{ref2}, y_{ref2})$ respectively. The normalization of the original image 11 may also comprise a sub-step of reframing in which only the normalized part of the image covering the face is retained. The limits of the frame are, for example, determined on the basis of reference points $(x_{ref1}, y_{ref1})$ and $(x_{ref2}, y_{ref2})$ In FIG. 1, the normalized images 12 are illustrated following geometric transformation and reframing.

In a fourth step 104, at least a part of each normalized image 12 is compared with a corresponding part of a predetermined image 13 including a reference face. The reference face is a face on the basis of which the reference points $(x_{ref1}, y_{ref1})$ and $(x_{ref2}, y_{ref2})$ are determined, these points corresponding to the precise position of the eyes in a predetermined image. Advantageously, the reference face is an "average" face, i.e. obtained by averaging a set of faces. These faces are preferably of the same type as the face for which the positions of the eyes are to be determined. The parts of images used for the comparison are chosen in such a way as to cover at least a part of the face. They are all determined on the basis of reference points $(x_{ref1}, y_{ref1})$ and $(x_{ref2}, y_{ref2})$. Due to the geometric transformation in the normalization step 103, it is not exactly the same face parts of the original image 11 that are compared with the reference face, but significantly different parts taken relative to different test positions of the eyes. Moreover, the parts of images used for the comparison may possibly differ from one normalized image to another, a normalized image part always being compared with the corresponding part of the predetermined image 13. However, it is more advantageous to compare the same parts of images for all of the normalized images. In the case where the normalization step 103 comprises a reframing sub-step, all of the part of the normalized image 12 thus retained can be compared with the corresponding part of the predetermined image 13. The comparison of the parts of images may be carried out by any face recognition algorithm. It may involve, for example, the "eigenfaces" algorithm. Each comparison of a part of a normalized image 12n provides a result in the form of a digital value, referred to as the score $S_n$, where n varies from 1 to N. The scores $S_n$ represent the levels of resemblance between the part of the normalised image 12n concerned and the corresponding part of the predetermined image 13. They therefore represent the level of resemblance between a part of the face of the person and a part of the reference face. In practice, they enable determination of the extent to which these face parts coincide, and therefore the extent to which the test positions $(x_{t1}, y_{t1})$ and $(x_{t2}, y_{t2})$ of a test pair correspond to the actual positions of the eyes of the face in the original image 11.

In a fifth step 105, the different scores $S_n$ are compared with one another and the test positions $(x_{t1}, y_{t1})$ and $(x_{t2}, y_{t2})$ of the test pair associated with the best score $S_n$ are considered as the actual positions of the eyes of the face in the original image 11. The term "best score" is obviously understood to mean the score corresponding to the highest level of resemblance between a normalised image part 12n and the corresponding part of the predetermined image 13.

In a preceding step, the different image processing algorithms used in the method according to the invention may be configured. In particular, the value of the radius r of a circle defining the adjacent area of an approximate position of an eye can be determined on the basis of tests carried out on a learning image base, eyes being visible in these images. The image processing algorithm used for the first step 101 of the method according to the invention is also used with the images of the learning base to provide approximate positions of the eyes, denoted $(x_i, y_i)$, where the index i allows the different eyes to be referenced. Moreover, the real positions of these eyes are referenced and denoted $(x_{ir}, y_{ir})$ with the same index i. The real positions are, for example, referenced manually by a user. The uncertainty of the position of an eye referenced i may be represented by the Euclidean distance $e_i$ between the position of the eye $(x_i, y_i)$ provided by the algorithm and the real position of this eye $(x_{ir}, y_{ir})$. This distance is defined by the following relation:

$$e_i = \sqrt{(x_i - x_{ir})^2 + (y_i - y_{ir})^2} \quad (1)$$

The radius r can then be determined as being an average of the Euclidean distances $e_i$.

Figure 2:
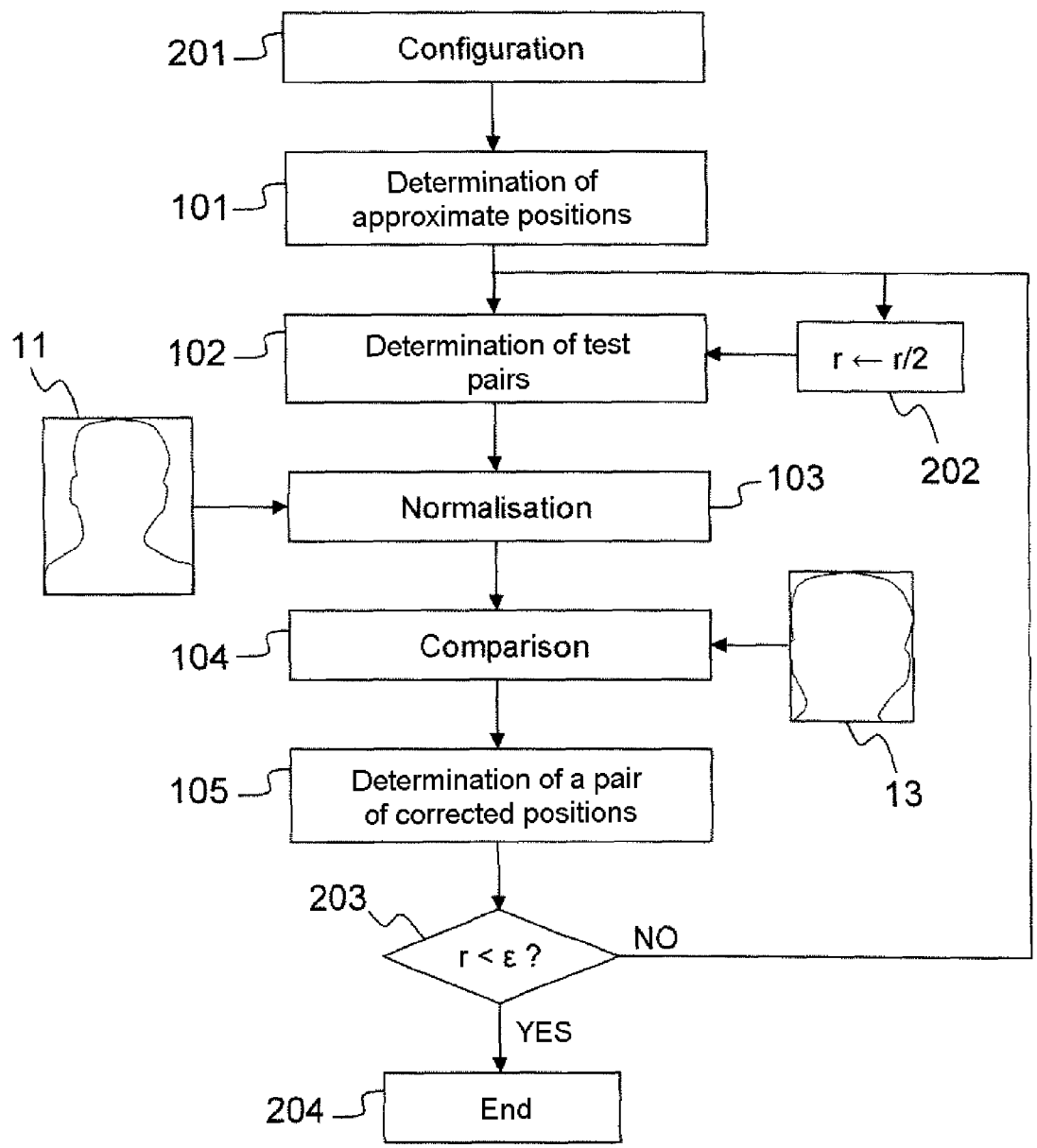
FIG. 2 shows an example of the method for progressively correcting the position of the eyes in an image through repetition of steps of the method shown in FIG. 1.

FIG. 2 shows an example of the method for correcting the position of the eyes in an image carried out on the basis of the method described above. According to this correction method, the steps 102 to 105 are repeated in a loop by considering, in each new iteration of the loop, smaller and smaller adjacent areas around the actual positions determined in the preceding iteration of the loop. The actual positions are thus corrected progressively in each iteration of the loop. In a first step 201, the different image processing algorithms used in the method according to the invention are configured. In particular, the radius r of the circle allowing definition of the adjacent area of positions can be determined. The steps 101 to 105 as described with reference to FIG. 1 can then be performed, the performance of steps 102 to 105 forming a first iteration of the loop. At the end of step 105, a pair of actual positions is determined. This pair of positions is then re-inserted as a pair of approximate positions for the step 102 of determining test pairs. The test pairs are determined in a more restricted adjacent area than in the preceding iteration of the loop. The radius r is, for example, divided by two in a step 202, as shown in FIG. 2. The steps 103 to 105 are then performed successively, the performance of steps 102 to 105 forming a second iteration of the loop. The steps 102 to 105 can thus be repeated following successive iterations of the loop until a precision of actual positions of the eyes deemed to be satisfactory is obtained. This precision is, for example, achieved when the radius r of the circle becomes less than a predetermined threshold ε. A step 203 is inserted for this purpose at the end of step 105 in such a way as to trigger or not trigger a new iteration of the loop. When the precision of the actual positions is deemed to be satisfactory, the method is ended in a step 204.

What is claimed is:

1. A method for determining positions of eyes of a face in a two-dimensional digital image, spatial dimensions of the two-dimensional digital image consisting of a first spatial dimension and a second spatial dimension, the first spatial dimension being orthogonal to the second spatial dimension, the method comprising:
    determining a pair of approximate positions of the eyes in the two-dimensional digital image;
    determining test pairs of the positions of the eyes on a basis of the pair of approximate positions, each position of an eye in each of the test pairs being in an adjacent area of the approximate position of a corresponding eye;
    geometrically transforming, for each test pair, the two-dimensional digital image into a normalized image in such a way as to make the positions of the eyes of each test pair coincide with a pair of predetermined reference positions;
    comparing at least a part of each normalized image covering at least a part of the face with a corresponding part of a predetermined image, each comparison providing a score representing a level of resemblance between the part of the normalized image and that of the predetermined image; and
    declaring the positions of the eyes of the test pair associated with the best score as actual positions of the eyes of the face.

2. The method of claim 1, wherein the adjacent area of the approximate position of the corresponding eye is determined by a circle with a radius (r) centered on said position.

3. The method of claim 2, wherein the radius (r) is an average of two-dimensional Euclidean distances between a real position of an eye in an image of a learning base and the approximate position of the eye determined by an image processing algorithm used for the step of determining the pair of approximate positions of the eyes in the two-dimensional digital image.

4. The method of claim 2, wherein the test pairs are determined in such a way that the position of at least one eye in each of the test pairs is located on the circle with radius (r) centered on the approximate position of the corresponding eye.

5. The method of claim 2, wherein test pairs are determined on a basis of a combination of positions where each position corresponds either
    to the approximate position of the eye concerned,
    to one of four cardinal positions located on the circle with radius (r) centered on said approximate position, or
    to one of four intercardinal positions located on the circle with radius (r) centered on said approximate position.

6. A method for progressively correcting positions of eyes of a face in a two-dimensional digital image on a basis of a pair of approximate positions and an adjacent area around each approximate position, spatial dimensions of the two-dimensional digital image consisting of a first spatial dimension and a second spatial dimension, the first spatial dimension being orthogonal to the second spatial dimension, the method comprising an iteration of the following steps, dimensions of the adjacent area being reduced in each iteration:
    determining test pairs of the positions of the eyes on the basis of the pair of approximate positions, each position of an eye in a test pair being in the adjacent area of the approximate position of a corresponding eye;
    geometrically transforming, for each test pair, the two-dimensional digital image into a normalized image in such a way as to make the positions of the eyes of each test pair coincide with a pair of predetermined reference positions;
    comparing at least a part of each normalized image covering at least a part of the face with a corresponding part of a predetermined image, each comparison providing a score representing a level of resemblance between the part of the normalized image and that of the predetermined image; and
    declaring the positions of the eyes of the test pair associated with the best score as new approximate positions of the eyes of the face.

7. The method of claim 6, wherein the adjacent area of the approximate position of an eye is determined by a circle with radius (r) centered on said position.

8. The method of claim 7, wherein test pairs are determined in such a way that the position of at least one eye in each of the test pairs is located on the circle with radius (r) centered on the approximate position of the corresponding eye.

9. The method of claim 7, wherein test pairs are determined on a basis of a combination of positions where each position corresponds either
    to the approximate position of the eye concerned,
    to one of four cardinal positions located on the circle with radius (r) centered on said approximate position, or
    to one of four intercardinal positions located on the circle with a radius (r) centered on said approximate position.

* * * * *